United States Patent [19]
Abell, Jr. et al.

[11] Patent Number: 5,268,816
[45] Date of Patent: Dec. 7, 1993

[54] MOVABLE DISPLAY SCREEN FOR A COMPUTER

[75] Inventors: William A. Abell, Jr., Wilmore; Vencil D. Engle, Lexington, both of Ky.

[73] Assignee: Lexmark International, Inc., Greenwich, Conn.

[21] Appl. No.: 951,980

[22] Filed: Sep. 28, 1982

[51] Int. Cl.⁵ ............................. H05K 7/16; G06F 1/16
[52] U.S. Cl. .................................. 361/729; 361/679
[58] Field of Search ............... 40/152.1, 493; 248/913, 248/917–923, 122; 400/83, 88, 680–682, 685; 361/380, 390–395, 399; 364/708

[56] References Cited

U.S. PATENT DOCUMENTS

| | | | |
|---|---|---|---|
| 4,438,458 | 3/1984 | Munscher | 358/254 X |
| 4,589,659 | 5/1986 | Yokoi et al. | 273/434 |
| 4,718,740 | 1/1988 | Cox | 312/223.2 |
| 4,832,419 | 5/1989 | Mitchell et al. | 312/223.2 X |
| 4,859,092 | 8/1989 | Makita | 400/83 |
| 4,964,018 | 10/1990 | Mallory et al. | 361/391 |
| 5,103,376 | 4/1992 | Blonder | 361/393 |
| 5,109,572 | 5/1992 | Park | 16/334 |

FOREIGN PATENT DOCUMENTS

| | | |
|---|---|---|
| 454120 | 10/1991 | European Pat. Off. |
| 60-160418 | 8/1985 | Japan |
| 60-189525 | 9/1985 | Japan |

*Primary Examiner*—Leo P. Picard
*Assistant Examiner*—Michael W. Phillips
*Attorney, Agent, or Firm*—Frank C. Leach, Jr.

[57] ABSTRACT

A portable personal computer has a display screen movable between a substantially vertical position when a keyboard is in a substantially horizontal position and exposed for use and a substantially horizontal position in which the keyboard is not accessible or viewable but the display screen is accessible and viewable. In its substantially horizontal position, the display screen can be used as a book reading device or a pen based personal computer, for example. When the display screen is in its substantially horizontal position, function control buttons are accessible.

8 Claims, 7 Drawing Sheets

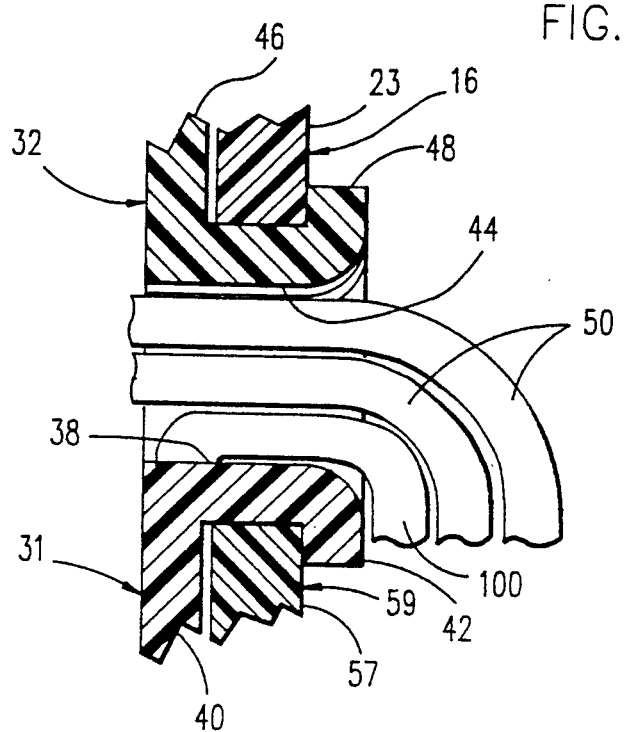
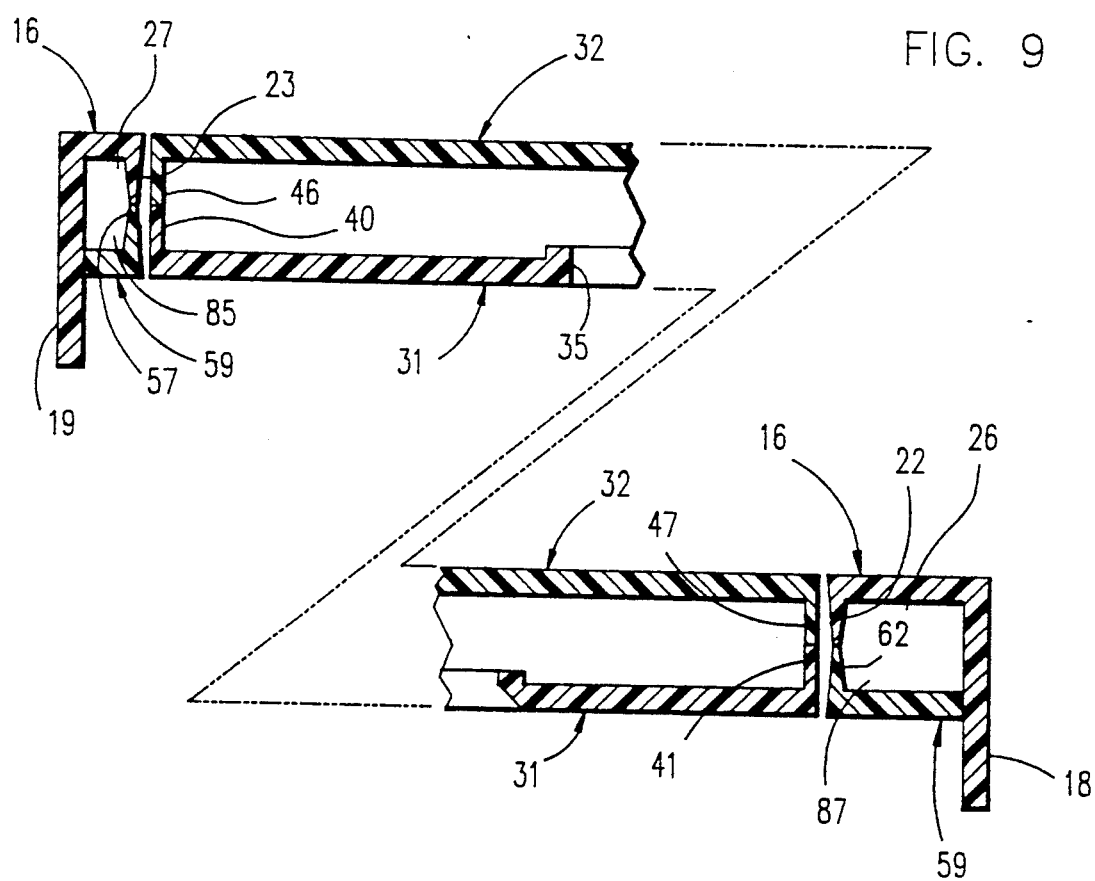

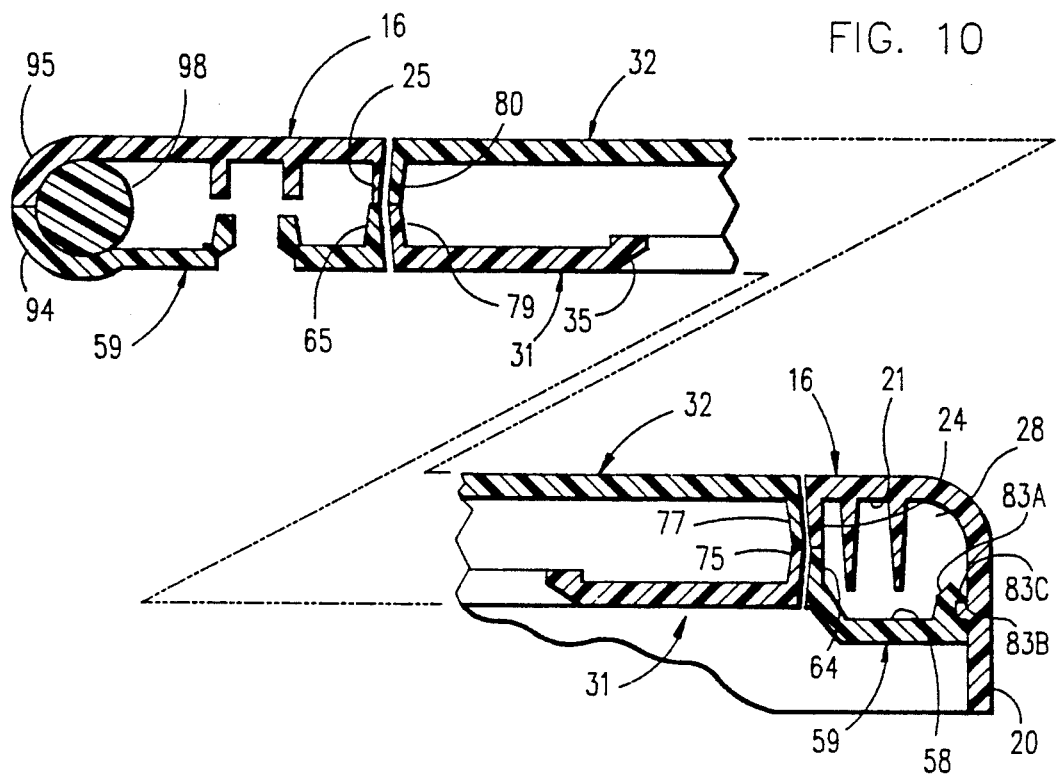
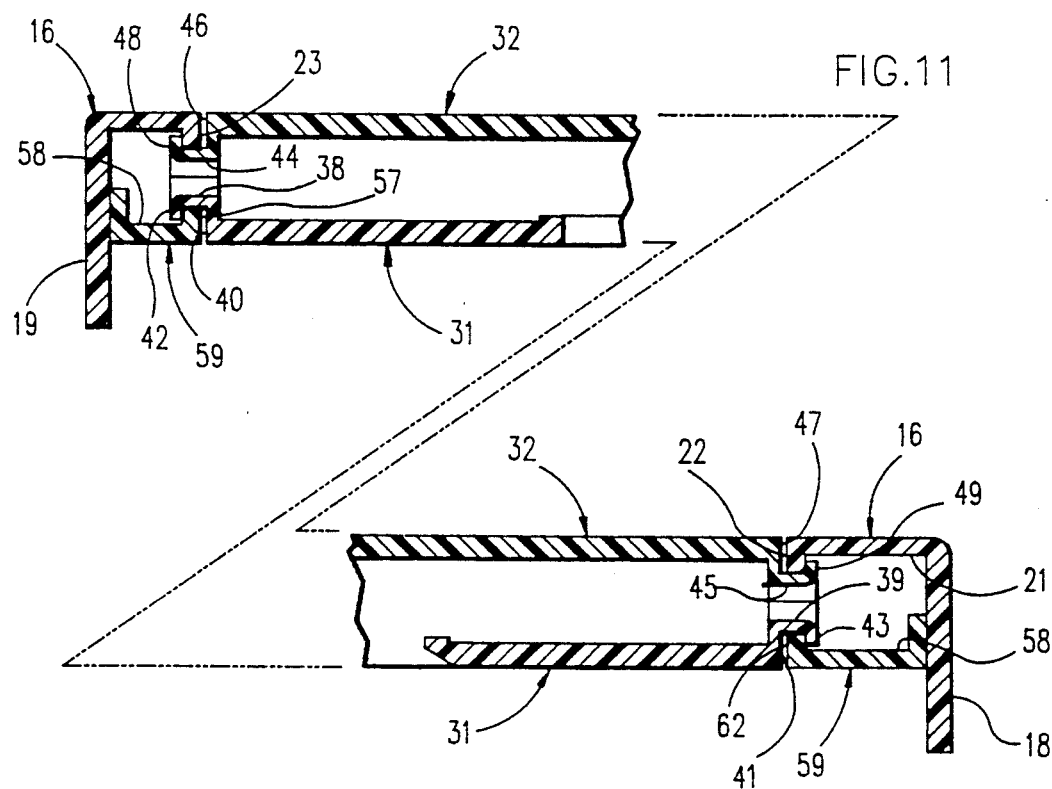

MOVABLE DISPLAY SCREEN FOR A COMPUTER

FIELD OF THE INVENTION

This invention relates to a computer arrangement having a display screen movable between two positions and, more particularly, to a computer arrangement having a display screen movable between a position in which both a keyboard and the display screen are accessible and viewable to a user and to a position in which the keyboard is not accessible or viewable to the user but the display screen is accessible and viewable.

BACKGROUND OF THE INVENTION

U.S. Pat. No. 5,103,376 to Blonder discloses a display screen for personal and laptop computers movable between a substantially vertical position and a substantially horizontal position. When the display screen is in its substantially vertical position, the keyboard is disposed in a substantially horizontal position so that a user may view the display screen when using the keyboard to enter data.

When data is to be entered through a graphics pen, for example, the display screen of the aforesaid Blonder patent is disposed in a substantially horizontal position. When the display screen is in its substantially horizontal position, the keyboard is disposed in a substantially vertical position in which the keys on the keyboard are in their normal orientation relative to the user.

To accomplish this disposition of the display screen in a substantially vertical or substantially horizontal position, the computer arrangement of the aforesaid Blonder patent uses a relatively complex hinge connection between the keyboard and the display screen. It also requires manual rotation of the computer through 180°.

One problem with the computer arrangement of the aforesaid Blonder patent is that the relatively complex hinge connection adds weight to the laptop computer, which is used as a portable computer. Since it is desired to have the weight of the laptop computer a minimum when used as a portable computer, this increased weight by the relatively complex hinge connection is not desirable. Furthermore, the additional weight of the computer makes it more difficult for a user to lift the computer to rotate the computer through 180° to shift the positions of the display screen.

Another problem with the computer arrangement of the aforesaid Blonder patent is that it requires the keyboard to be exposed when data is to be entered through the use of a graphics pen, for example. This exposure is necessary because of the need for certain function control buttons on the keyboard to be employed when entering data through the graphics pen. For example, it is necessary to move the cursor or to move the page up or down.

As a result of the keyboard of the aforesaid Blonder patent being exposed when data is to be entered through the use of a graphics pen, for example, the user cannot comfortably hold the computer in a relatively small space such as in an airplane seat, for example, and easily enter data through a graphics pen. The location of the function control buttons on the keyboard also makes it difficult to control the position of the cursor and other functions.

SUMMARY OF THE INVENTION

The computer arrangement of the present invention satisfactorily solves the foregoing problems. The dual position display screen of the present invention does not require a relatively complex hinge connection as in the aforesaid Blonder patent. Thus, the weight added to a laptop computer by the present invention is less than in the aforesaid Blonder patent.

The computer arrangement of the present invention does not require the user to manually lift the computer to rotate it to shift the position of the display screen between its substantially vertical and horizontal positions or vice versa. Instead, it is only necessary to pivot the display screen between two positions when the display screen is in its substantially vertical position so that the display screen will be exposed to the user when the display screen is moved to a substantially horizontal position to overlie the keyboard. Thus, movement of the display screen between its two viewable and accessible positions is substantially simplified by the computer arrangement of the present invention.

The computer arrangement of the present invention avoids the need for access to the keyboard when the display screen is in its substantially horizontal position in which it is viewable and accessible and overlying the keyboard. This is accomplished through providing function control buttons in a display screen support.

Thus, with the display screen in its substantially horizontal position so that it is both accessible and viewable, a small portable or notebook type computer may be used not only to have data entered by a graphics pen, for example, but also as a book reading device, for example. Accordingly, a disk having data of a book on it, for example, may be inserted into a disk drive of the computer and read. The function control buttons in the support structure for the display screen enable movement of the page up and down and shifting of the cursor, for example. Furthermore, with the display screen in its substantially horizontal position in which it is both accessible and viewable, the computer may be easily used in a relatively small space such as in an airplane seat, for example. There is no vertical protrusion of the keyboard as in the aforesaid Blonder patent, for example.

Additionally, with the display screen in its substantially horizontal position in which it is both accessible and viewable, the computer can be held so that the display screen cannot be viewed by others. The disposition of the display screen in a substantially horizontal position also enables a photocopy to be made of the material on the display screen since it can be laid flat on a photocopy machine.

An object of this invention is to provide a computer arrangement having a display screen movable between two positions in which the display screen may be viewed.

Another object of this invention is to provide a portable computer having a display screen positioned substantially vertical when used with a substantially horizontal disposed keyboard and positioned substantially horizontal for use when the keyboard is not accessible.

A further object of this invention is to provide a portable computer in which its display screen may be viewed and is accessible when a computer top cover is closed. Other objects of this invention will be readily perceived from the following description, claims, and drawings.

BRIEF DESCRIPTION OF THE DRAWINGS

In the drawings:

FIG. 6 is a fragmentary sectional view of portions of the top cover, the front and rear covers for the display screen, and the bezel of FIG. 4 and showing electric cables exiting therefrom.

FIG. 9 is a fragmentary sectional view of the top cover, the front and rear covers for the display screen with the display screen omitted, and the bezel and taken along line 9—9 of FIG. 5.

FIG. 10 is a fragmentary sectional view of the top cover, the front and rear covers for the display screen with the display screen omitted, and the bezel and taken along line 10—10 of FIG. 5.

FIG. 11 is a fragmentary sectional view of the top cover, the front and rear covers for the display screen with the display screen omitted, and the bezel and taken along line 11—11 of FIG. 5.

DETAILED DESCRIPTION

Figure 1:
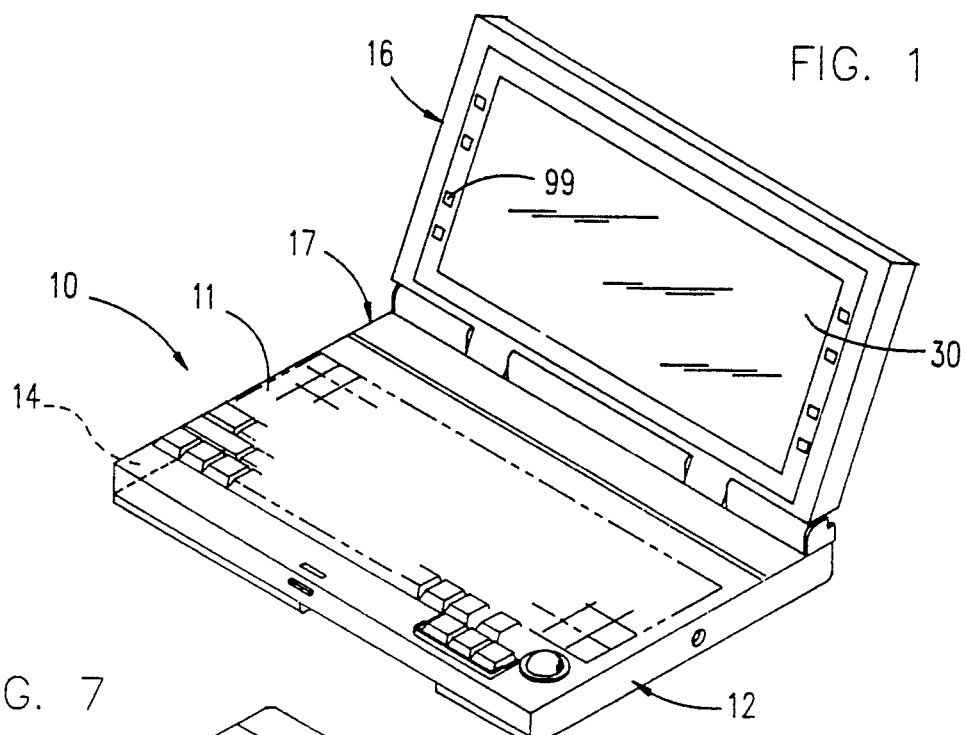
FIG. 1 is a perspective view of a computer with both its keyboard and its display screen accessible.

Referring to the drawings and particularly FIG. 1, there is shown a laptop computer 10. The computer 10 has a keyboard 11 supported within a bottom cover assembly 12. The keyboard 11 is electrically connected to a printed circuit board including a microprocessor within the bottom cover assembly 12.

The bottom cover assembly 12 has an opening (not shown) in its side wall 14 to enable a disk drive (not shown) within the bottom cover assembly 12 to receive a disk, which can have data entered or received. For example, if the computer 10 is to be used to enable reading of data from the disk, then the disk is a read only disk.

Figure 3:
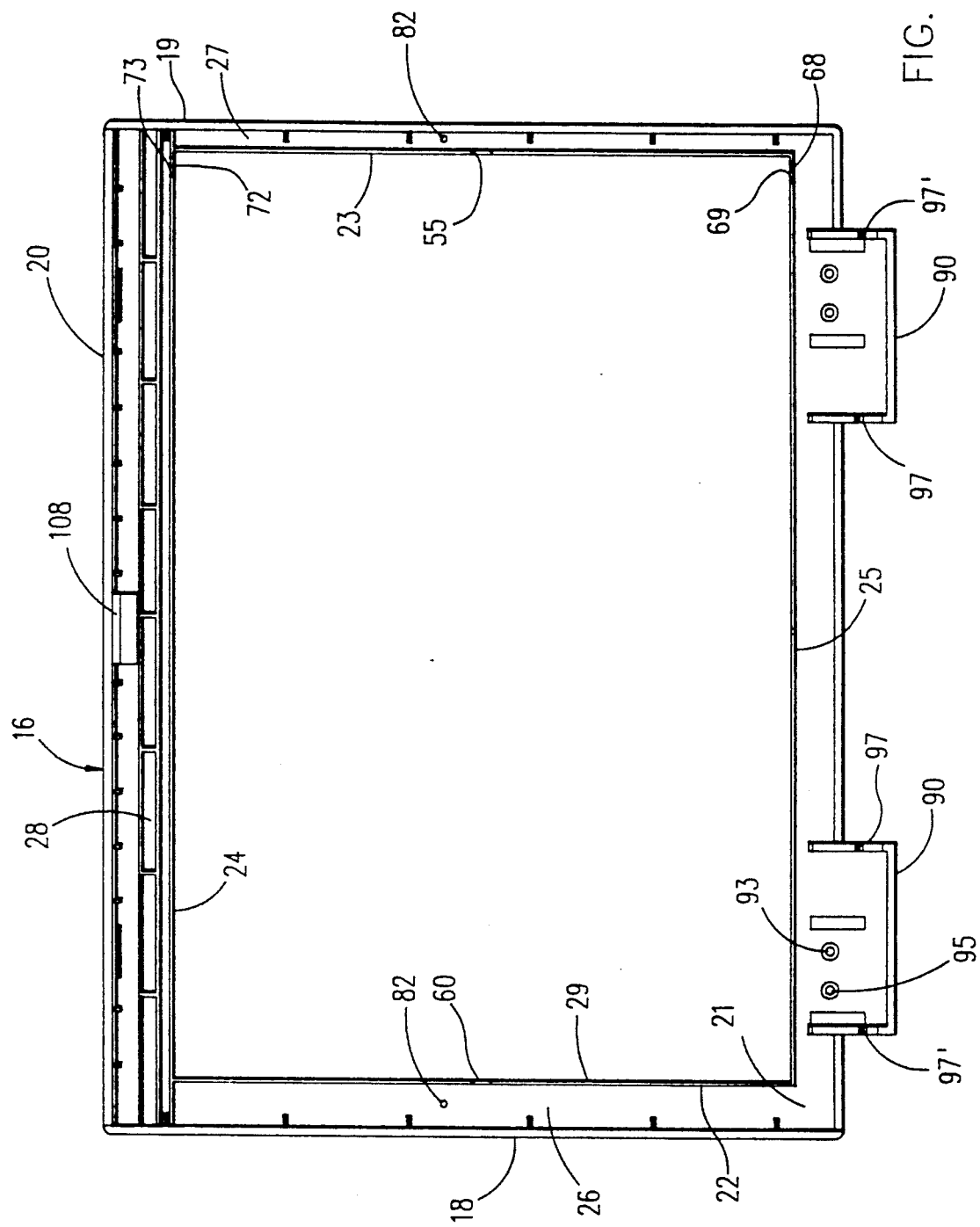
FIG. 3 is an elevational view of the interior of the top cover.

A top cover 16 is pivotally mounted on a rear cover 17, which is attached to the bottom cover assembly 12. The top cover 16 has two substantially parallel outer side walls 18 (see FIG. 3) and 19 with an outer front end wall 20 extending substantially perpendicular to each of the side walls 18 and 19 at one of their ends. The walls 18, 19, and 20 project inwardly from an inner surface 21 of the top cover 16.

The inner surface 21 has substantially parallel side walls 22 and 23 extending inwardly from its inner side edges. A front end wall 24 extends between the side walls 18 and 19 and is connected to one end of each of the side walls 22 and 23. A rear end wall 25 extends between the other end of each of the side walls 22 and 23 and is substantially parallel to the front end wall 24. The end walls 24 and 25 are substantially perpendicular to the side walls 18 and 19.

The inner surface 21 has the walls 22, 23, and 24 spaced from the walls 18, 19, and 20, respectively. Accordingly, a space 26 is formed between the side walls 18 and 22, a space 27 is formed between the side walls 19 and 23, and a space 28 is formed between the front end walls 20 and 24. A rectangular shaped opening 29 in the top cover 16 is defined by the inner surfaces of the walls 22-25.

Figure 5:
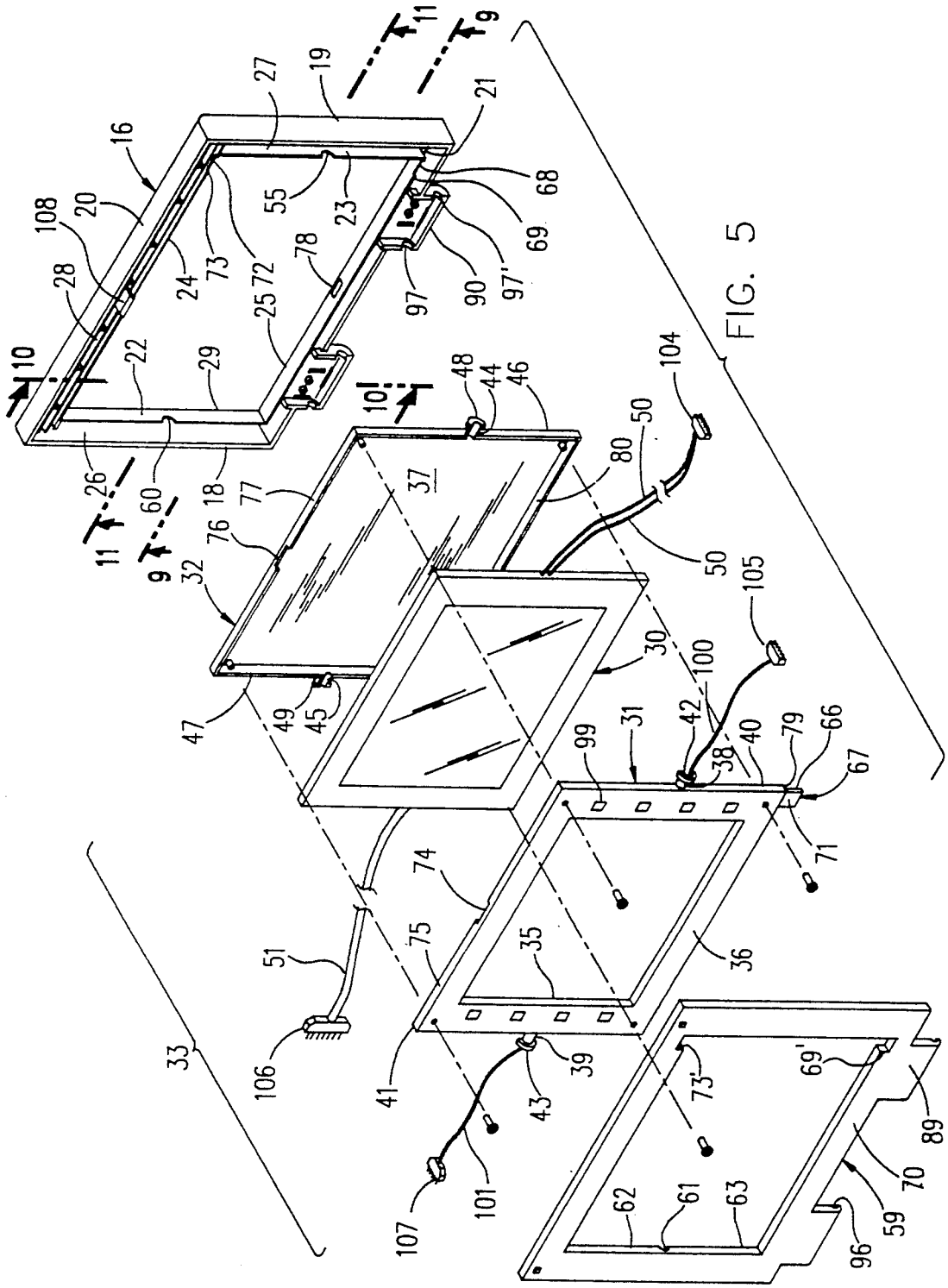
FIG. 5 is an exploded perspective view of the top cover, the display screen and its support, and the bezel.

A display screen 30 (see FIG. 5), which is preferably a liquid crystal display screen, is sandwiched between a front screen cover 31 and a rear screen cover 32. To enable a graphics pen to be used with the display screen 30, a digitizer, which is transparent and can be obtained from Scriptel Corporation, 4145 Arlingate Plaza, Columbus, OH, for example, is adhered to the display screen 30. Thus, the display screen 30 and the covers 31 and 32 comprise a display screen portion 33.

The front screen cover 31 has a rectangular shaped opening 35 in its main wall 36 through which the display screen 30 is viewable. The rear screen cover 32 has a solid main wall 37 to protect the display screen 30 when the computer 10 has the configuration of FIG. 8 in which neither the keyboard 11 (see FIG. 1) nor the display screen 30 is viewable or accessible. This is the transport position of the computer 10.

The front screen cover 31 (see FIG. 5) has semi-cylindrical hollow pivots 38 and 39 extending from the inner surfaces of its substantially parallel side walls 40 and 41, respectively, and through the side walls 40 and 41, respectively. Each of the semi-cylindrical hollow pivots 38 and 39 has a semi-circular lip 42 and 43, respectively, at its free end.

The rear screen cover 32 has semi-cylindrical hollow pivots 44 and 45 extending from the inner surfaces of its substantially parallel side walls 46 and 47, respectively, and through the side walls 46 and 47, respectively. Each of the semi-cylindrical hollow pivots 44 and 45 has a semi-circular lip 48 and 49, respectively, at its free end.

When the front screen cover 31 and the rear screen cover 32 are secured to each other with the display screen 30 sandwiched therebetween, the pivots 38 and 44 cooperate to form a hollow axial passage through which electric cables can pass as do the pivots 39 and 45. The display screen 30 has two backlight cables 50 extending therefrom through the hollow axial passage defined by the cooperating pivots 38 and 44. A data signal cable 51 extends from the opposite side of the display screen 30 and through the hollow axial passage defined by the cooperating pivots 39 and 45.

The pivot 44 rests in a cutout bearing portion 55 in the side wall 23 of the top cover 16. The pivot 38 rests in a cutout bearing portion 56 (see FIG. 4) in a side wall 57 extending from an inner surface 58 of a bezel 59.

As shown in FIG. 6, the side wall 23 of the top cover 16 fits between the side wall 46 of the rear screen cover 32 and the lip 48 on the pivot 44. The side wall 57 of the bezel 59 fits between the lip 42 on the pivot 38 and the side wall 40 of the front screen cover 31.

The pivot 45 (see FIG. 5) rests in a cutout bearing portion 60 in the side wall 22 of the top cover 16 and the pivot 39 rests in a cutout bearing portion 61 in a side wall 62, which is substantially parallel to the side wall 57 (see FIG. 4), extending from the inner surface 58 of the bezel 59.

The side wall 22 (see FIG. 5) of the top cover 16 fits between the side wall 47 of the rear screen cover 32 and the lip 49 on the pivot 45 as shown in FIG. 11. The side wall 62 of the bezel 59 fits between the lip 43 on the pivot 39 and the side wall 41 of the front screen cover 31 as shown in FIG. 11.

Accordingly, the display screen 30 (see FIG. 5) is pivotable between a first position in which the rear screen cover 32 is disposed in the opening 29 in the top cover 16 and the display screen 30 is viewable and accessible through an opening 63 in the bezel 59 and a second position in which the rear screen cover 32 is disposed within the opening 63 in the bezel 59 and the display screen 30 is viewable and accessible through the opening 29 in the top cover 16. The first position of the display screen 30 occurs when the computer 10 is in the position of FIG. 1. The second position of the display screen 30 occurs when the computer 10 is in the position of FIG. 7 when the keyboard 11 (see FIG. 1) is not accessible or viewable but the display screen 30 (see FIG. 5) is both accessible and viewable.

When the display screen 30 is viewable through the opening 63, which is defined by the side walls 57 (see FIG. 4) and 62 and end walls 64 and 65, in the bezel 59, its position is determined by an end surface 66 (see FIG. 5) on a tab 67, which extends downwardly from the front screen cover 31, engaging an end surface 68 (see FIG. 3) of a notch 69 in the rear end wall 25 of the top cover 16 after passing through a notch 69' (see FIG. 5) in an outer wall 70 of the bezel 59. When the display screen 30 is pivoted to the position in which the display screen 30 is viewable through the opening 29 in the top cover 16, the tab 67 has an end surface 71, which is substantially parallel to the end surface 66, engage an end surface 72 (see FIG. 3) of a notch 73 in the front end wall 24 of the top cover 16 after passing through a notch 73' (see FIG. 5) in the outer wall 70 of the bezel 59.

Thus, the tab 67 and the notches 69 and 73 cooperate to limit pivoting of the display screen 30 to about 180°. Therefore, continuous rotation of the display screen 30 is prevented so that the cables 50 and 51 cannot be wound up and damaged.

Figure 2:
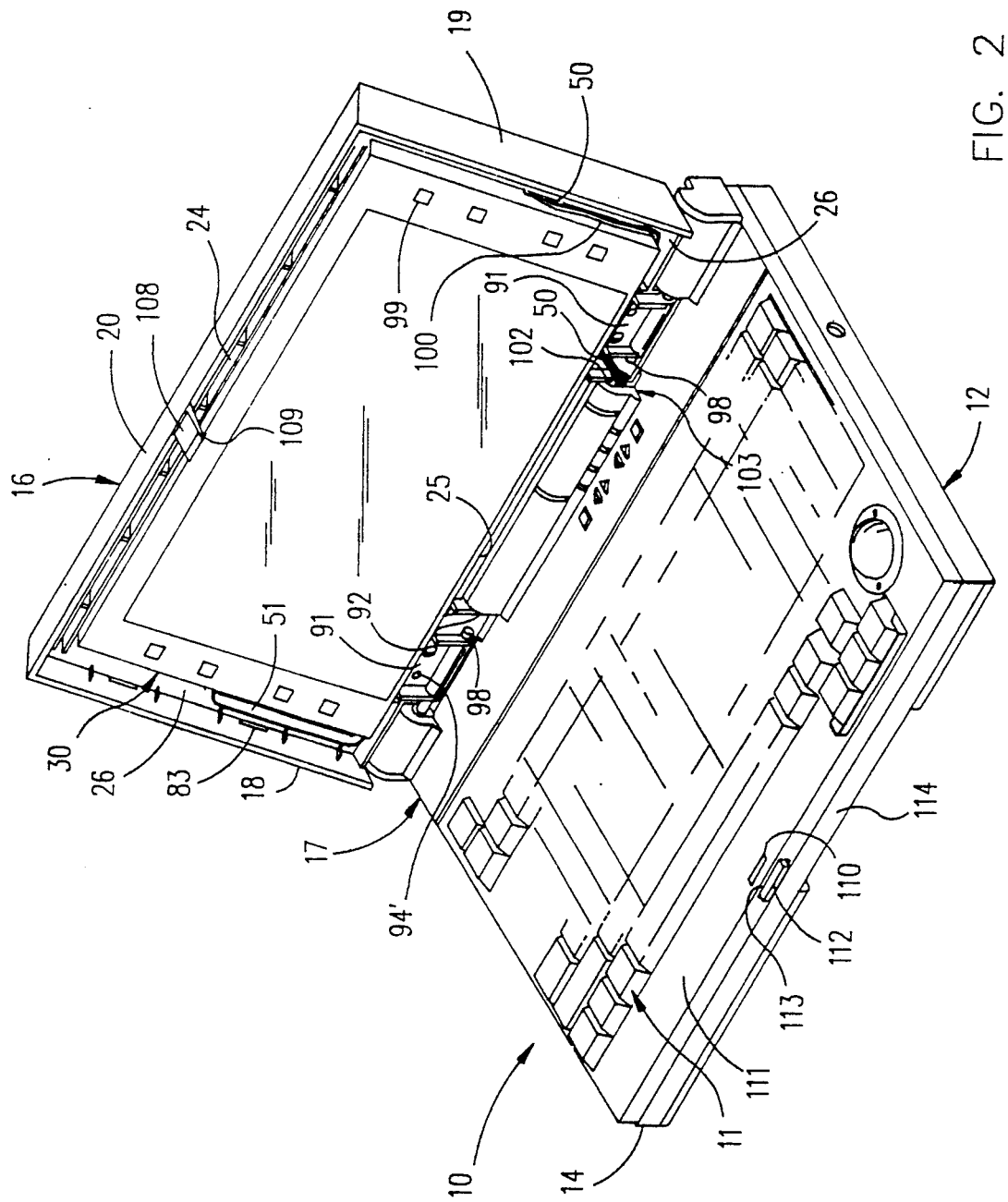
FIG. 2 is a perspective view of the computer of FIG. 1 but having a bezel removed to show the interior of a top cover having the display screen mounted therein with the display screen having its front and rear covers omitted for clarity purposes.

When pivoting of the display screen 30 is stopped at either of the desired positions, the display screen portion 33 is retained against movement by a detent arrangement. The detent arrangement includes an opening 74 in a wall 75 of the front screen cover 31 cooperating with an opening 76 in a wall 77 of the rear screen cover 32 to form a rectangular shaped opening to receive a protrusion 78 on the rear end wall 25 of the top cover 16 when the screen display portion 33 is pivoted 180° from the position in FIG. 2.

The front screen cover 31 (see FIG. 5) has an opening (not shown) in its wall 79, which is substantially parallel to the wall 75, corresponding to the opening 74 in the wall 75. The rear screen cover 32 has an opening (not shown) in its wall 80, which is substantially parallel to the wall 77, corresponding to the opening 76 in the wall 77. The openings in the walls 79 and 80 cooperate to form a rectangular shaped opening to receive the protrusion 78 when the screen display portion 33 is in the position of FIG. 5.

Figure 4:
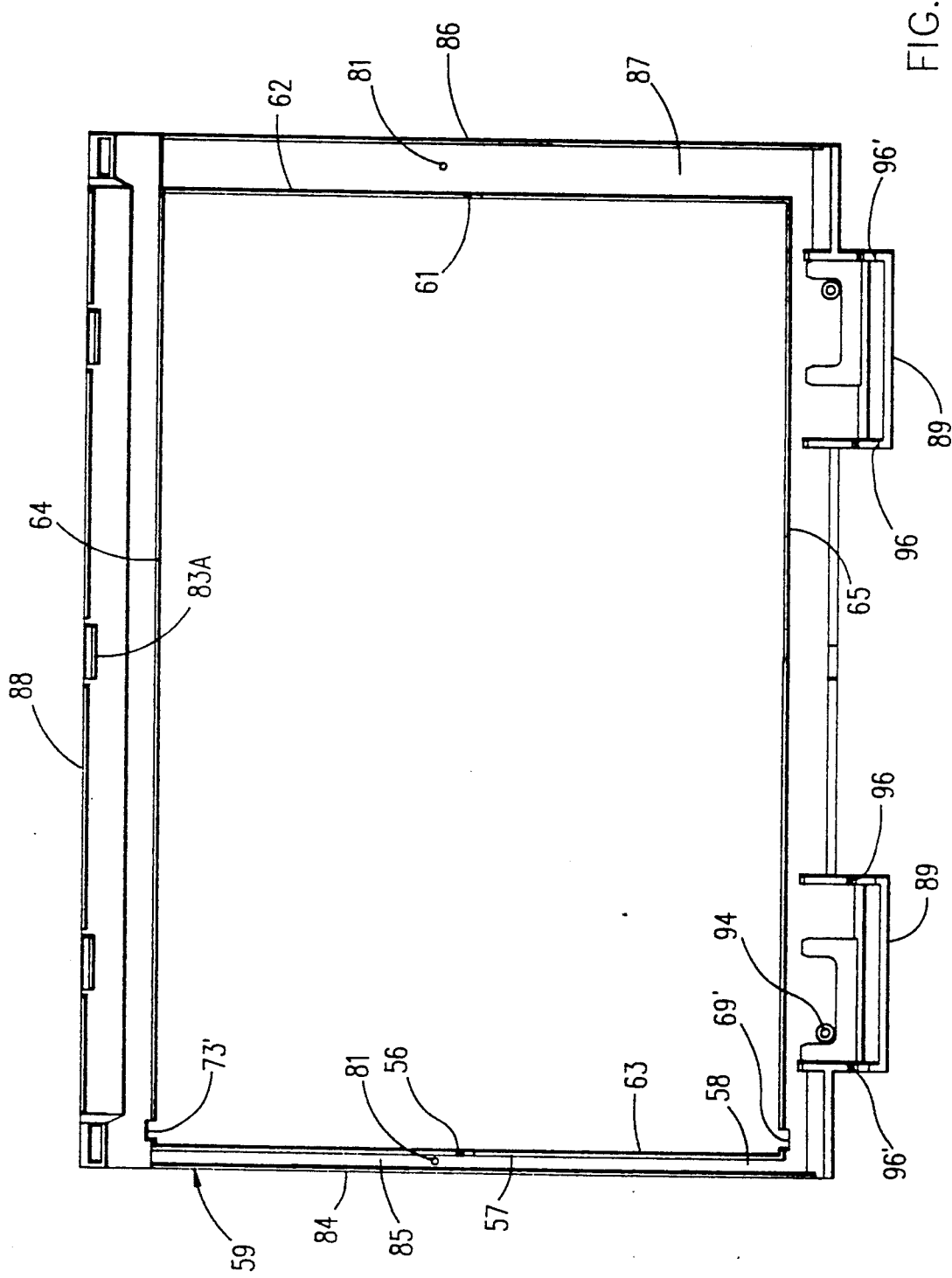
FIG. 4 is an elevational view of the interior of the bezel.

As shown in FIG. 4, the inner surface 58 of the bezel 59 has a hole 81 on each of its sides. Each of the holes 81 receives a screw (not shown) for disposition within a tapped hole 82 (see FIG. 3) in the inner surface 21 of the top cover 16. These connect the bezel 59 (see FIG. 5) to the top cover 16.

The bezel 59 (see FIG. 4) has three latches 83A along its front end. As shown in FIG. 10, each of the latches 83A has a hooked end 83B for cooperation with a retaining protrusion 83C extending inwardly from the outer front end wall 20 of the top cover 16. These also connect the bezel 59 (see FIG. 5) to the top cover 16.

The bezel 59 (see FIG. 4) also has an outer side wall 84 extending from the inner surface 58. The side wall 84 is spaced from the side wall 57 to form a space 85 therebetween.

When the bezel 59 is connected to the top cover 16 (see FIG. 9), the side wall 57 of the bezel 59 abuts the side wall 23 of the top cover 16 and the outer side wall 84 (see FIG. 4) of the bezel 59 fits within the outer side wall 19 (see FIG. 2) of the top cover 16 and bears thereagainst whereby the space 85 (see FIG. 9) communicates with the space 27.

The bezel 59 (see FIG. 4) has an outer side wall 86, which is substantially parallel to the side wall 84. The side wall 86 is spaced from the side wall 62 to form a space 87 therebetween. When the bezel 59 is connected to the top cover 16 (see FIG. 9), the side wall 62 of the bezel 59 abuts the side wall 22 of the top cover 16 and the outer side wall 86 (see FIG. 4) of the bezel 59 fits inside of the outer side wall 18 (see FIG. 3) of the top cover 16 and bears thereagainst whereby the space 87 (see FIG. 9) in the bezel 59 is in communication with the space 26 in the top cover 16.

As shown in FIG. 10, the front end wall 24 of the top cover 16 abuts the front end wall 64 of the bezel 59 and the rear end wall 25 of the top cover 16 abuts the rear end wall 65 of the bezel 59 when the bezel 59 is connected to the top cover 16. When the bezel 59 is connected to the top cover 16, an outer front end wall 88 (see FIG. 4), which is interrupted by the latches 83A, of the bezel 59 fits inside of the outer front end wall 20 (see FIG. 5) of the top cover 16 and bears thereagainst. Thus, the bezel 59 is surrounded by the outer walls 18, 19, and 20 of the top cover 16.

The bezel 59 (see FIG. 4) has a pair of hinge portions 89 with each being secured to a separate hinge portion 90 (see FIG. 3) extending from the rear end of the top cover 16 after a hinge 91 (see FIG. 2) is secured to each of the hinge portions 90 (see FIG. 3) by a screw 92 (see FIG. 2) extending through a hole in the hinge 91 into a tapped hole 93 (see FIG. 3) in the hinge portion 90.

Each of the hinge portions 90 is secured to one of the hinge portions 89 (see FIG. 4) by screws extending through a hole 94 (see FIG. 3) in the hinge portion 89, a hole 94' (see FIG. 2) in the hinge 91, and a tapped hole 95 (see FIG. 3) in the hinge portion 90.

Each of the hinge portions 89 (see FIG. 4) has a semi-circular opening 96 at one of its ends larger than a semi-circular opening 96' at its other end. A circular opening is formed by each of the semi-circular openings 96 cooperating with a semi-circular opening 97 (see FIG. 3), which is the same radius as the semi-circular opening 96 (see FIG. 4), at one end of the hinge portion 90 (see FIG. 3) of the top cover 16 to which the hinge portion 89 is secured. Each of the semi-circular openings 96' (see FIG. 4) cooperates with a semi-circular opening 97' (see FIG. 3), which is the same radius as the semi-circular openings 96' (see FIG. 4) and is at the other end of the hinge portion 90 (see FIG. 3) of the top cover 16 to which the hinge portion 89 (see FIG. 4) is secured, to form a smaller circular opening.

Each of the smaller circular openings formed by the smaller cooperating semi-circular openings 96' and 97' (see FIG. 3) enables a hinge pin 98 (see FIG. 2) to extend from the rear cover 17 through one of the hinges 91 after passing through one of the smaller circular openings. This hinge arrangement enables the top cover 16 (see FIG. 5), the bezel 59, and the display screen portion 33 therebetween to be pivoted between the vertical position of FIG. 1 and the horizontal position of FIG. 7 or 8.

The front screen cover 31 (see FIG. 5) has a plurality of control buttons 99 mounted thereon on opposite sides of the opening 35 to enable control of the cursor and other functions when the display screen 30 is viewable through the opening 29 in the top cover 16. Although the control buttons 99 (see FIG. 5) may be employed when the computer 10 (see FIG. 1) is in the position of FIG. 1, the control buttons 99 (see FIG. 5) are employed primarily when the computer 10 (see FIG. 7) is in the position of FIG. 7.

The control buttons 99 (see FIG. 5) on the right side of the front screen cover 31 are connected to a plurality of wires, fourteen in number, for example, within a cable 100 extending from the right side of the front screen cover 31. The control buttons 99 on the left side of the front screen cover 31 are connected to a plurality of wires, five in number, for example, within a cable 101 extending from the left side of the front screen cover 31. The cables 50, 51, 100, and 101 constitute electric communicating means.

The cables 50 and 100 extend through the space 27 (see FIG. 9) in the top cover 16 and the communicating space 85 in the bezel 59 and then beneath the rear end wall 25 (see FIG. 2) of the top cover 16 and the rear end wall 65 (see FIG. 4) of the bezel 59. The cables 50 (see FIG. 5) and 100 then pass through the circular opening, which is formed by one of the semi-circular openings 96 (see FIG. 4) in the hinge portion 89 and one of the semi-circular openings 97 (see FIG. 3) in the hinge portion 90, and into an opening 102 (see FIG. 2) at one end of a portion 103 of the rear cover 17. This enables a plug 104 (see FIG. 5) on the end of the cables 50 to be plugged into a socket of the printed circuit board within the bottom cover assembly 12 (see FIG. 2) and a plug 105 (see FIG. 5) on the end of the cable 100 to be inserted into a socket of the printed circuit board within the bottom cover assembly 12 (see FIG. 2).

In a similar manner, the cables 51 (see FIG. 5) and 101 extend through the space 26 (see FIG. 9) in the top cover 16 and the communicating space 87 in the bezel 59 and beneath the rear end wall 25 (see FIG. 2) of the top cover 16 and the rear end wall 65 (see FIG. 4) of the bezel 59. The cables 51 (see FIG. 5) and 101 then pass through the circular opening, which is formed by the other of the semicircular openings 96 (see FIG. 4) in the hinge portion 89 and the other of the semi-circular openings 97 (see FIG. 3) in the hinge portion 90 and into an opening (not shown) in the portion 103 (see FIG. 2) of the rear cover 17 at its end opposite from the end having the opening 102. This enables a plug 106 (see FIG. 5) on the end of the cable 51 to be inserted within a socket of the printed circuit board within the bottom cover assembly 12 (see FIG. 2) and a plug 107 (see FIG. 5) on the end of the cable 101 to be inserted into a socket of the printed circuit board within the bottom cover assembly 12 (see FIG. 2).

Figure 7:
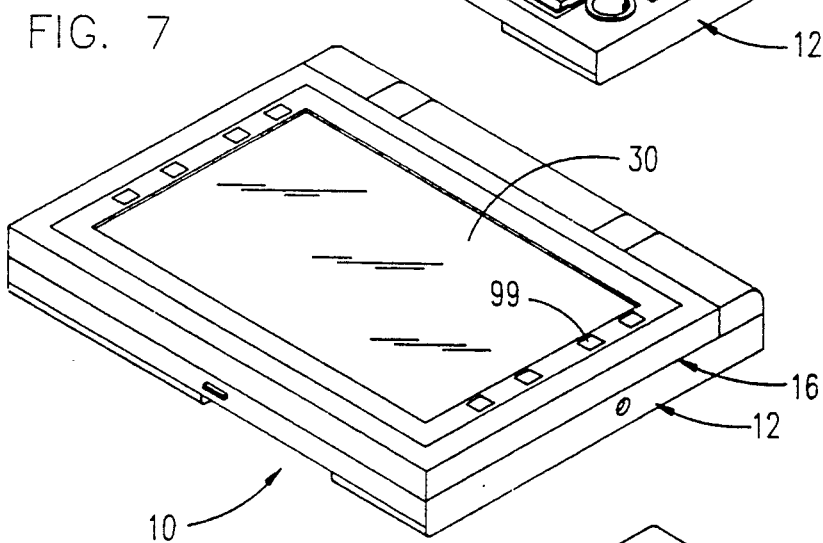
FIG. 7 is a perspective view of the computer of FIG. 1 with the display screen shown in its viewable and accessible position and the keyboard not being accessible or viewable.
Figure 8:
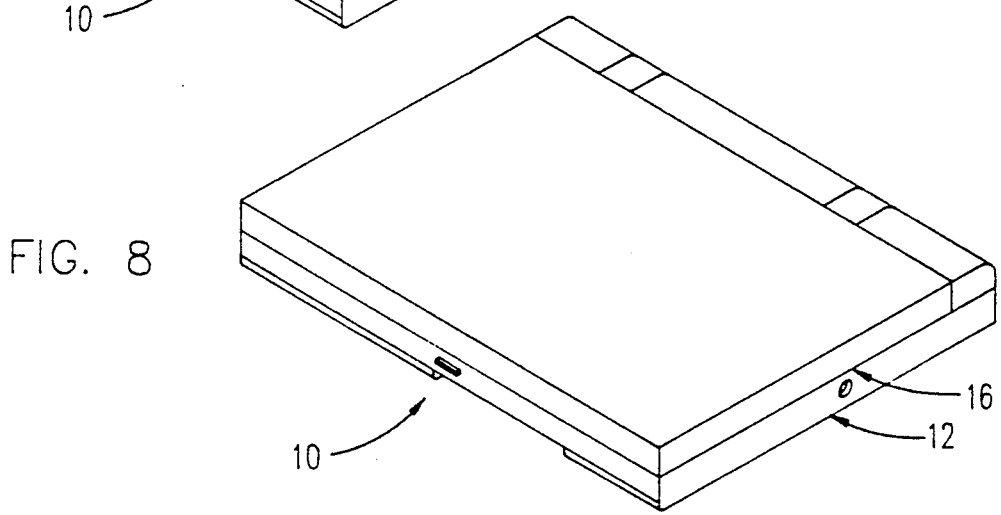
FIG. 8 is a perspective view of the computer of FIG. 1 in which the top cover is closed so that neither the keyboard nor the display screen is accessible or viewable.

When the top cover 16 is pivoted to its closed position of FIG. 7 or 8, a latch 108 (see FIG. 2), which has a hooked end 109, is inserted in a rectangular shaped opening 110 in an upper surface 111 of the bottom cover assembly 12. The hooked end 109 passes through a rectangular shaped opening (not shown) in a resiliently biased element 112, which protrudes through an opening 113 in a front end wall 114 of the bottom cover assembly 12. The resiliently biased element 112, which is urged outwardly by a spring (not shown) to protrude beyond the front end wall 114, has the hooked end 109 of the latch 108 engage a lip beneath the rectangular shaped opening (not shown) in the resiliently biased element 112. Thus, when the top cover 16 is to not be retained in its locked position on top of the bottom cover assembly 12, inward pushing of the resiliently biased element 112 against its spring releases the hooked end 109 from engagement with the resiliently biased element 112.

An advantage of this invention is that it provides a compact arrangement for a portable computer when a display screen is to be used without the keyboard being accessible. Another advantage of this invention is that it insures that a display screen of a portable computer is at its desired position. A further advantage of this invention is that a photocopy of a display screen of a portable computer may be made.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. A computer arrangement including:
   a keyboard portion;
   and a display portion including:
   a display screen;
   first support means for supporting said display screen;
   second support means for supporting said first support means, said second support means being pivotally connected to said keyboard portion of movement of said second support means between a first position in which said second support means overlies said keyboard portion and a second position in which said second support means is at an angle to said keyboard portion to enable viewing of said display screen by a user of said keyboard portion;
   pivotal mounting means for pivotally mounting said first support means on said second support means for movement of said display screen between a first position in which said display screen is disposed at an angle to said keyboard portion and viewable when said second support means is in its second position and a second position in which said display screen overlies said keyboard portion and is viewable and accessible when said second support means is in its first position, said display screen being movable between its first position and its second position only when said second support means is in its second portion;
   said first support means having function control means for controlling computer functions when said first support means is in its second position and said second support means is in its first position;

said first support means including:
  a front screen cover and a rear screen cover connected to each other and retaining said display screen therebetween;
  only one of said front screen cover and said rear screen cover having a rectangular shaped opening through which said display screen is viewable;
  said one screen cover having said function control means thereon and adjacent said opening therein;
  each of said front screen cover and said rear screen cover having a semi-cylindrical hollow pivot extending from each side thereof;
  said semi-cylindrical hollow pivots on one side of each of said front and rear screen covers cooperating to form a hollow axial passage extending therethrough;
  a first cable connected to at least one of said function control means and extending through said hollow axial passage formed in said semi-cylindrical hollow pivots on one side of said front and rear screen covers;
  a second cable extending from said display screen through said hollow axial passage formed in said semi-cylindrical hollow pivots on the one side of each of said front and rear screen covers;
  said semi-cylindrical hollow pivots on the opposite side of each of said front and rear screen covers cooperating to form a hollow axial passage extending therethrough;
  a third cable connected to at least one other of said function control means and extending through said hollow axial passage formed by said semi-cylindrical hollow pivots on the opposite side of each of said front and rear screen covers;
  and a fourth cable extending from the opposite side of said display screen through said hollow axial passage formed by said semi-cylindrical hollow pivots on the opposite side of each of said front and rear screen covers;
  and said second support means including:
    a top cover having an inner surface, a front end wall, a rear end wall substantially parallel to said front end wall, and two substantially parallel inner side walls;
    each of said front end wall, said rear end wall, and said inner side walls extending substantially perpendicular from said inner surface;
each of said inner side walls extending between said front end wall and said rear end wall and substantially perpendicular to each of said front end wall and said rear end wall;
said front end wall, said rear end wall, and said inner side walls defining a substantially rectangular shaped opening in said top cover;
said top cover having first and second substantially parallel outer side walls extending substantially perpendicular from said inner surface;
said first and second outer side walls of said top cover being substantially parallel to said inner side walls of said top cover;
said first outer side wall of said top cover being spaced from one of said inner side walls of said top cover to form a first space therebetween;
said second outer side wall of said top cover being spaced from the other of said inner side walls of said top cover to form a second space therebetween;
a bezel connected to said top cover;
said bezel having an inner surface, a front end wall, a rear end wall substantially parallel to said front end wall, and two substantially parallel inner side walls;
each of said front end wall, said rear end wall, and said inner side walls of said bezel extending substantially perpendicular from said inner surface;
said bezel having each of said inner side walls extend between said front end wall and said rear end wall and substantially perpendicular to each of said front end wall and said rear end wall;
said front end wall, said rear end wall, and said inner side walls defining a substantially rectangular shaped opening in said bezel;
said bezel having first and second substantially parallel outer side walls extending substantially perpendicular from said inner surface;
said first and second outer side walls of said bezel being substantially parallel to said inner side walls of said bezel;
said first outer side wall of said bezel being spaced from one of said inner side walls of said bezel to form a first space therebetween;
said second outer side wall of said bezel being spaced from the other of said inner side walls of said bezel to form a second space therebetween;
said first space of said top cover and said first space of said bezel communicating with each other to form a first passage therebetween when said top cover and said bezel are connected;
said second space of said top cover and said second space of said bezel communicating with each other to form a second passage therebetween when said top cover and said bezel are connected;
said first outer side wall of said bezel being disposed inside of said first outer side wall of said top cover and bearing against said inner surface of said top cover when said top cover and said bezel are connected;
said first outer side wall of said bezel being disposed inside of said second outer side wall of said top cover and bearing against said inner surface of said top cover when said top cover and said bezel are connected;
one of said side walls of said top cover and one of said inner side walls of said bezel having their end surfaces engage when said top cover and said bezel are connected;
the other of said inner side walls of said top cover and the other of said inner side walls of said bezel having their end surfaces engage when said top cover and said bezel are connected;
one of said inner side walls of said top cover and one of said inner side walls of said bezel having cooperating bearing portions to pivotally support one of said first pivotal mounting means and said second pivotal mounting means;
the other of said inner side walls of said top cover and one of said inner side walls of said bezel having cooperating bearing portions to pivotally support the other of said first pivotal mounting means and said second pivotal mounting means;
said hollow axial passage formed in said semi-cylindrical hollow pivots on one side of said front and rear screen covers communicating with said first passage formed between said top cover and said bezel to enable said first and second cables to pass through said first passage;

and said hollow axial passage formed in said semicylindrical hollow pivots on the other side of said front and rear screen covers communicating with said first passage formed between said top cover and said bezel to enable said third and fourth cables to pass through said first passage.

2. The computer arrangement according to claim 1 in which:

one of said front and rear screen covers has a tab extending therefrom;

said bezel has a notch in each of two of said substantially parallel walls to enable passage of said tab therethrough when said first support means is pivoted from its first position to its second position and vice versa;

said top cover has a notch in each of two of said substantially parallel walls to receive said tab after said tab passes through one of said notches in said bezel when said first support means is pivoted from its first position to its second position and vice versa;

and each of said notches in said top cover has its end surface engaged by said tab when said tab enters said notch to stop pivoting of said first support means at one of its first and second positions.

3. The computer arrangement according to claim 2 in which:

said front screen cover includes a top wall having an opening formed therein;

said rear screen cover includes a top wall having an opening formed therein for cooperation with said opening in said top wall of said front screen cover to form a first opening therebetween;

said front screen cover includes a bottom wall having an opening formed therein;

said rear screen cover includes a bottom wall having an opening formed therein for cooperation with said opening in said bottom wall of said front screen cover to form a second opening therebetween;

and one of said front end wall and said rear end wall of said top cover having engaging means for engaging one of said first and second openings in said front and rear screen covers when said first support means is in its first position to releasably retain said first support means in its first position and for engaging the other of said first and second openings in said front and rear screen covers when said first support means is in its second position to releasably retain said first support means in its second position.

4. The computer arrangement according to claim 2 in which:

said front and rear screen covers have first and second openings formed therebetween;

and said top cover has engaging means for engaging one of said first and second openings in said front and rear screen covers when said first support means is in its first position to releasably retain said first support means in its first position and for engaging the other of said first and second openings in said front and rear screen covers when said first support means is in its second position to releasably retain said first support means in its second position.

5. A computer arrangement including:

a keyboard portion;

and a display portion including;

a display screen;

first support means for supporting said display screen;

second support means for supporting said first support means, said second support means being pivotally connected to said keyboard portion for movement of said second support means between a first position in which said second support means overlies said keyboard portion and a second position in which said second support means is at an angle to said keyboard portion to enable viewing of said display screen by a user of said keyboard portion;

pivotal mounting means for pivotally mounting said first support means on said second support means for movement of said display screen between a first portion in which said display screen is disposed at an angle to said keyboard portion and viewable when said second support means is in its second position and a second position in which said display screen overlies said keyboard portion and is viewable and accessible when said second support means is in its first position, said display screen being movable between its first position and its second position only when said second support means is in its second position;

said pivotal mounting means including first and second pivotal mounting means extending from opposite side of said first support means;

each of said first pivotal mounting means and said second pivotal mounting means including receiving means for receiving electric communicating means extending from said display portion;

and said second support means including:

a top cover having an inner surface, a front end wall, a rear end wall substantially parallel to said front end wall, and two substantially parallel inner side walls;

each of said front end wall, said rear end wall, and said inner side walls extending substantially perpendicular from said inner surface;

each of said inner side walls extending between said front end wall and said rear end wall and substantially perpendicular to each of said front end wall and said rear end wall;

said front end wall, said rear end wall, and said inner side walls defining a substantially rectangular shaped opening in said top cover;

said top cover having first and second substantially parallel outer side walls extending substantially perpendicular from said inner surface;

first and second outer side walls of said top cover being substantially parallel to said inner side walls of said top cover;

said first outer side wall of said top cover being spaced from one of said inner side walls of said top cover to form a first space therebetween;

said second outer side wall of said top cover being spaced from the other of said inner side walls of said top cover to form a second space therebetween;

a bezel connected to said top cover;

said bezel having an inner surface, a front end wall, a rear end wall substantially parallel to said front end wall, and two substantially parallel inner side walls;

each of said front end wall of said bezel, said rear end wall, and said inner side walls of said bezel extending substantially perpendicular from said inner surface;

said bezel having each of said inner side walls extend between said front end wall and said rear end wall and substantially perpendicular to each of said front end wall and said rear end wall;

said front end wall, said rear end wall, and said inner side walls defining a substantially rectangular shaped opening in said bezel;

said bezel having first and second substantially parallel outer side walls extending substantially perpendicular from said inner surface;

said first and second outer side walls of said bezel being substantially parallel to said inner side walls of said bezel;

said first outer side wall of said bezel being spaced from one of said inner side walls of said bezel to form a first space therebetween;

said second outer side wall of said bezel being spaced from the other of said inner side walls of said bezel to form a second space therebetween;

said first space of said top cover and said first space of said bezel communicating with each other to form a first passage therebetween when said top cover and said bezel are connected;

said second space of said top cover and said second space of said bezel communicating with each other to form a second passage therebetween when said top cover and said bezel are connected;

said first outer side wall of said bezel being disposed inside of said first outer side wall of said top cover and bearing against said inner surface of said top cover when said top cover and said bezel are connected;

said first outer side wall of said bezel being disposed inside of said second outer side wall of said top cover and bearing against said inner surface of said top cover when said top cover and said bezel are connected;

one of said side walls of said top cover and one of said inner side walls of said bezel having their end surfaces engage when said top cover and said bezel are connected;

the other of said inner side walls of said top cover and the other of said inner side walls of said bezel having their end surfaces engage when said top cover and said bezel are connected;

one of said inner side walls of said top cover and one of said inner side walls of said bezel having cooperating bearing portions to pivotally support one of said first pivotal mounting means and said second pivotal mounting means;

the other of said inner side walls of said top cover and the other of said inner side walls of said bezel having cooperating bearing portions to pivotally support the other of said first pivotal mounting means and said second pivotal mounting means;

said receiving means of said first pivotal mounting means communicating with said first passage formed between said top cover and said bezel to enable the electric communicating means received in said receiving means of said first pivotal mounting means to pass through said first passage;

and said receiving means of said second pivotal mounting means communicating with said second passage formed between said top cover and said bezel to enable the electric communicating means received in said receiving means of said second pivotal mounting means to pass through said second passage.

6. The computer arrangement according to claim 5, in which:

said first support means includes:

a front screen cover and a rear screen cover connected to each other and retaining said display screen therebetween;

only one of said front screen cover and said rear screen cover having a rectangular shaped opening through which said display screen is viewable;

and one of said front and rear screen covers having a tab extending therefrom;

said bezel has a notch in each of two of said substantially parallel walls to enable passage of said tab therethrough when said first support means is pivoted from its first position to its second position and vice versa;

said top cover has a notch in each of two of said substantially parallel walls to received said tab after said tab passes through one of said notches in said bezel when said first support means is pivoted from its first position to its second position and vice versa;

and each of said notches in said top cover has an end surface engaged by said tab when said tab enters said notch to stop pivoting of said first support means at one of its first and second positions.

7. The computer arrangement according to claim 6, in which:

said front and rear screen covers have first and second openings formed therebetween;

and said top cover has engaging means for engaging one of said first and second openings in said front and rear screen covers when said first support means is in its first position to releasably retain said first support means in its first position and for engaging the other of said first and second openings in said front and rear screen covers when said first support means is in its second position to releasably retain said first support means in its second position.

8. A computer arrangement including:

a keyboard portion;

and a display portion including:

a display screen;

first support means for supporting said display screen;

second support means for supporting said first support means, said second support means being pivotally connected to said keyboard portion for movement of said second support means between a first position in which said second support means overlies said keyboard portion and a second position in which said second support means is at an angle to said keyboard portion to enable viewing of said display screen by a user of said keyboard position;

pivotal mounting means for pivotally mounting said first support means on said second support means for movement of said display screen between a first position in which said display screen is disposed at an angle to said keyboard portion and viewable when said second support means is in its second position and a second position in which said display screen overlies said keyboard portion and is viewable and accessible when said second support means is in its first position, said display screen being movable between its first position and its second position only when said second support means is in its second position;

said first support means including a front screen cover and a rear screen cover connected to each other and retaining said display screen therebetween;

said second support means including:
a top cover having two substantially parallel walls;
a bezel connected to said top cover;
said bezel having two substantially parallel walls;
one of said front and rear screen covers having a tab extending therefrom;
said bezel having a notch in each of said two substantially parallel walls to enable passage of said tab therethrough when said first support means is pivoted from its first position to its second position and vice versa;
said top cover having a notch in each of said two substantially parallel walls to receive said tab after said tab passes through one of said notches in said bezel when said first support means is pivoted from its first position to its second position and vice versa;
and each of said notches in said top cover having its end surface engaged by said tab when said tab enters said notch to stop pivoting of said first support means at one of its first and second positions.

* * * * *

UNITED STATES PATENT AND TRADEMARK OFFICE
CERTIFICATE OF CORRECTION

PATENT NO. : 5,268,816
DATED : December 7, 1993
INVENTOR(S) : William A. Abell, Jr. et al It is certified that error appears in the above-identified patent and that said Letters Patent is hereby corrected as shown below:

Column 2, Line 66  Sentence beginning "Other objects of..." should be a new paragraph;
Column 5, Line 56  Delete ")not" and insert —(not—.

In the Claims:

Claim 1, Column 8, Line 42   Delete "of" and insert —for—,
Claim 1, Column 8, Line 63   Delete "portion;" and insert —position;—,
Claim 1, Column 10, Line 14  Delete "land" and insert —and—,
Claim 1, Column 10, Line 44  Delete "first" and insert —second—,
Claim 1, Column 10, Line 49  After "said" (first occurrence) insert —inner—,
Claim 1, Column 11, Line 9   Delete "first" and insert —second—,
Claim 1, Column 11, Line 10  Delete "first" and insert —second—;
Claim 5, Column 12, Line 21  Delete "portion" and insert —position—,
Claim 5, Column 12, Line 33  Delete "side" and insert —sides—,
Claim 5, Column 12, Line 56  Before "first" insert —said—,
Claim 5, Column 13, Line 41  Delete "first" and insert —second—.

Signed and Sealed this

Sixth Day of September, 1994

Attest:

BRUCE LEHMAN

Attesting Officer       Commissioner of Patents and Trademarks